Oct. 6, 1964
W. C. WHITCOMB
3,151,373
CLAMP FOR CONDUIT COUPLINGS
Filed April 14, 1961
4 Sheets-Sheet 1
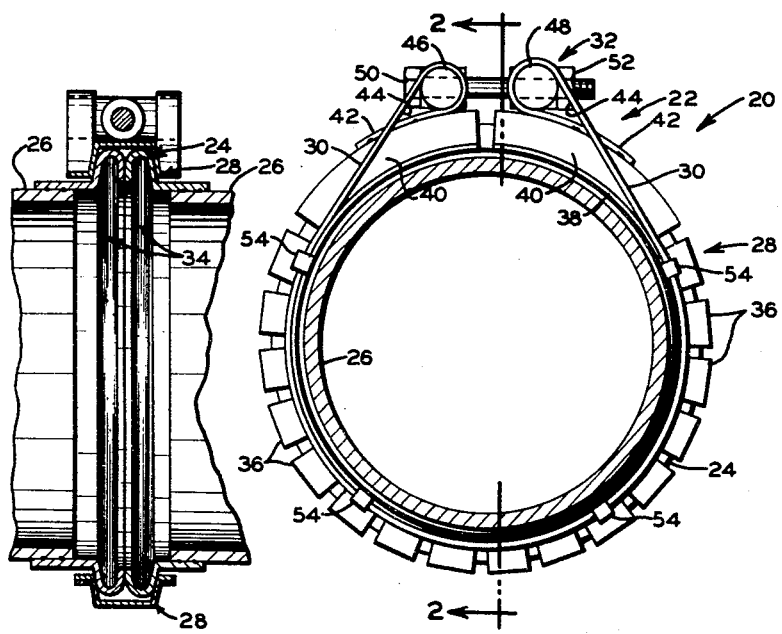
FIG.1.
FIG.2.
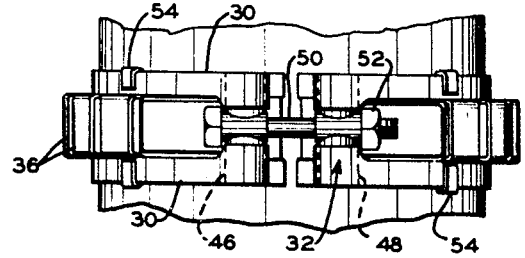
FIG.3.
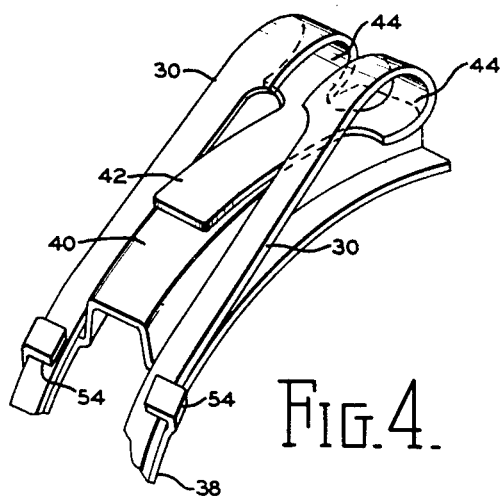
FIG.4.
INVENTOR.
WILLIAM C. WHITCOMB
BY
Alfred L. Patmore, Jr.
ATTORNEY

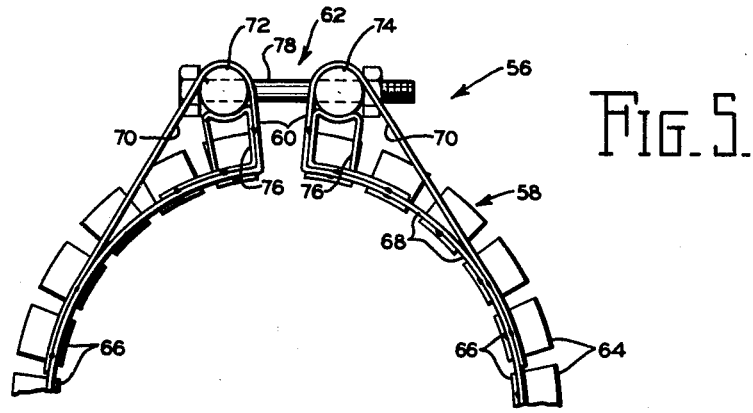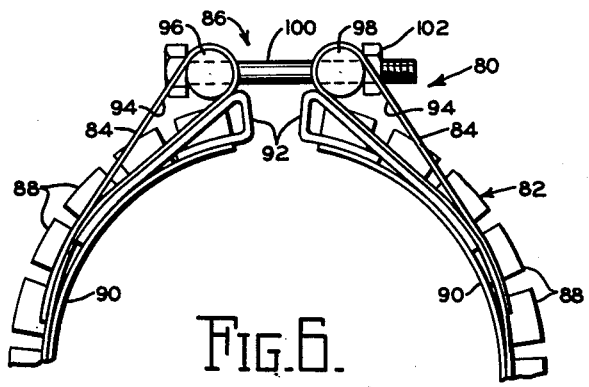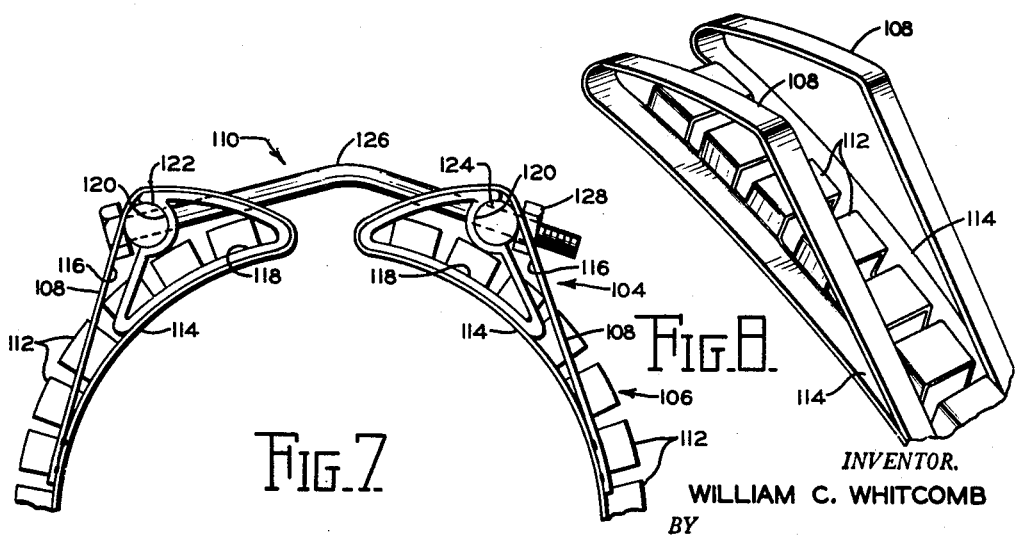

Oct. 6, 1964     W. C. WHITCOMB     3,151,373
CLAMP FOR CONDUIT COUPLINGS

Filed April 14, 1961     4 Sheets-Sheet 3

INVENTOR.
WILLIAM C. WHITCOMB
BY
*Alfred L. Patmore, Jr.*
ATTORNEY

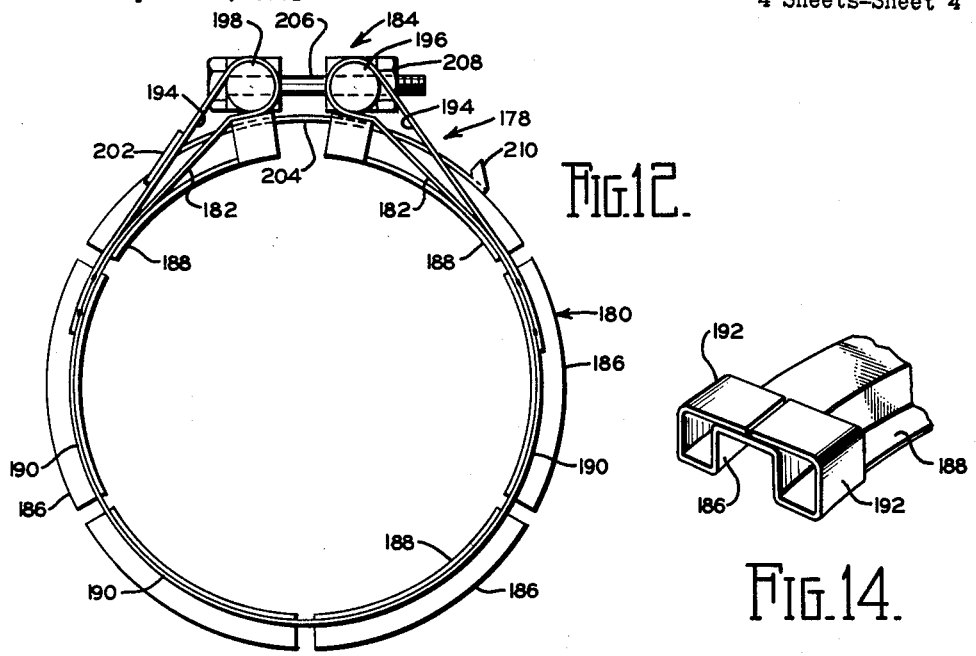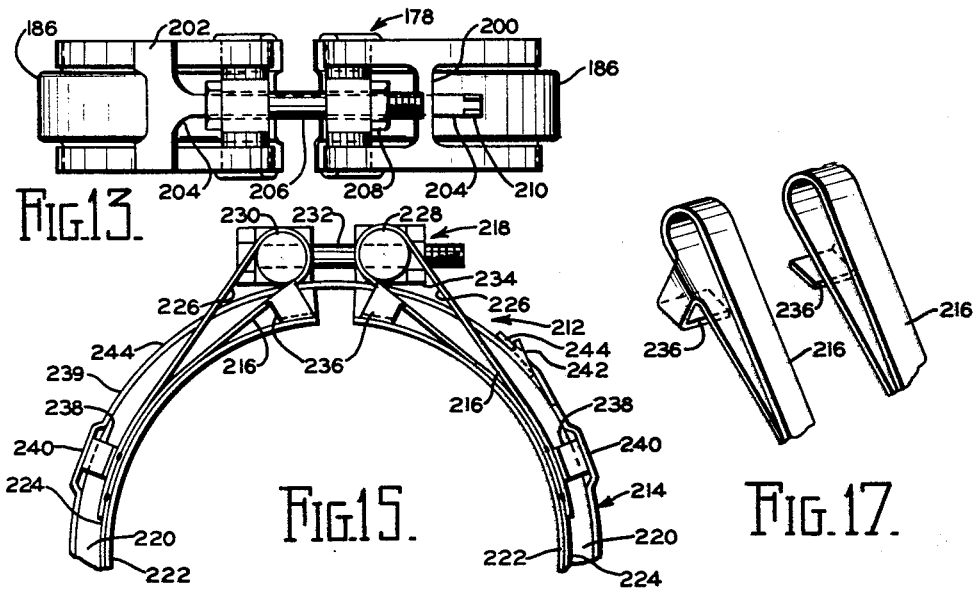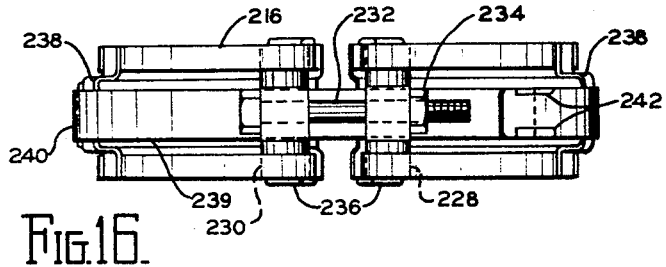

United States Patent Office 3,151,373
Patented Oct. 6, 1964

3,151,373
CLAMP FOR CONDUIT COUPLINGS
William C. Whitcomb, Hilliards, Ohio, assignor to
Midland-Ross Corporation, Toledo, Ohio, a corporation of Ohio
Filed Apr. 14, 1961, Ser. No. 103,054
5 Claims. (Cl. 24—279)

This invention relates to an improved clamp particularly for use in conduit couplings which must be capable of withstanding a large pressure differential without leakage.

Many types of conduits, particularly thin walled high pressure conduits frequently employed in aircraft, have sealing components at their ends, which components, when held tightly with similar components of other conduits, enable joints at the adjacent ends of the conduits to withstand very high pressure differentials between the interior and the exterior of the conduits without leakage. The sealing components are forced together by clamps including clamping channels which extend around the peripheries of the conduits and which are constricted when the ends thereof are drawn together by any suitable means. As the clamping channels are constricted, they force the sealing components together and hold them in pressure-tight relationship until the channels are released.

In presently known clamps, the constricting force applied to the clamping channels is directed in such a manner that the bands have a tendency to yield or spread as they are constricted or forced radially inwardly on the sealing components. This has been reduced or overcome by reinforcing the channels or making them of heavier metal. However, these remedies add to the costs of the channels and to their weight, the latter being of particular importance when the channels are employed in aircraft.

The present invention relates to a clamp and clamping channel which overcome the above difficulties. With the new channel, there is no tendency for yielding or spreading because of the manner in which the constricting forces are applied and, hence, the clamp can be less expensive and lighter in weight. In a preferred form, the new clamping channel is also easier and less expensive to manufacture than those now available.

It is, therefore, a principal object of the invention to provide an improved clamp with a clamping channel which yields to a lesser extent when forced radially inwardly on sealing components of conduits.

Another object of the invention is to provide an improved clamping channel which is less expensive and lighter in weight.

Other objects and advantages of the invention will be apparent from the following detailed description of preferred embodiments thereof, reference being made to the accompanying drawings, in which:

FIG. 1 is a side view of a coupling embodying a clamp in accordance with the principles of the invention and used with a conduit shown in cross section;

FIG. 2 is a view in cross section taken along the line 2—2 of FIG. 1;

FIG. 3 is a top view of the coupling shown in FIGS. 1 and 2;

FIG. 4 is a detailed, fragmentary view in perspective of a portion of a clamping channel constituting part of the clamp shown in FIGS. 1–3;

FIG. 5 is a fragmentary side view of a modified clamp embodying the principles of the invention;

FIG. 6 is a fragmentary side view of another modified clamp embodying the principles of the invention;

FIG. 7 is a fragmentary, side view of still another modified clamp embodying the principles of the invention;

FIG. 8 is an enlarged detailed view in perspective of a clamping channel constituting part of the clamp shown in FIG. 7;

FIG. 12 is a fragmentary, side view of a further modified clamp embodying the principles of the invention;

FIG. 13 is a top view of the clamp shown in FIG. 12;

FIG. 14 is a detailed view in perspective of a portion of an element of the clamp shown in FIGS. 12 and 13;

FIG. 15 is a fragmentary, side view of a still further modified clamp embodying the principles of the invention;

FIG. 16 is a top view of the clamp shown in FIG. 15; and

FIG. 17 is a detailed, fragmentary view in perspective of a portion of an element of the clamp shown in FIGS. 15 and 16.

Figure 9:
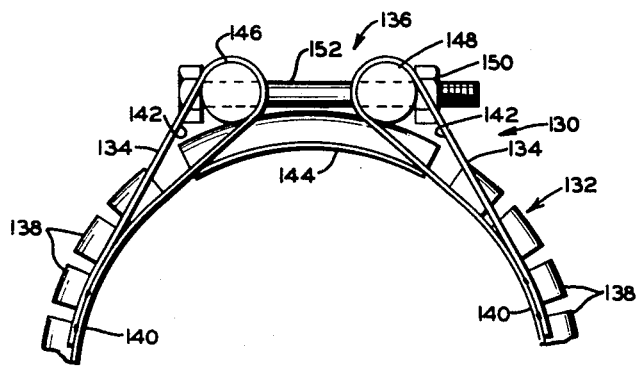
FIG. 9 is a fragmentary, side view of still another modified clamp embodying the principles of the invention.

As used herein, the term axial cross section refers to a cross section taken in a plane generally parallel to the axes of conduits with which the conduit couplings of the invention are used.

Referring to the drawings and more particularly to FIGS. 1–3, a conduit coupling 20 includes a clamp 22 in accordance with the principles of the invention and sealing components 24 which are attached to ends of conduits 26 and form a tight joint thereat when held together by the clamp 22. The clamp 22 includes a clamping channel 28, constricting straps or elements 30, and a tightening mechanism 32. The sealing components 24 can be of any suitable type and in this instance are shown as annular flanges 34 which are U-shaped in axial cross section and meet in sealing relationship when forced together by the clamping channel 28.

In accordance with the invention, the clamping channel 28 includes a plurality of U-shaped or channel-shaped segments 36 having webs and side walls, the free edges of which are integral with interconnecting flanges 38. These flanges extend around the conduits 26 on each side of the annular flanges 34 of the sealing components 24 and both longitudinally space and align the segments 36. Elongate U-shaped portions 40 of the clamping band 28 adjacent the tightening mechanism 32 are not segmented in the present embodiment but are otherwise similar to the segments 36. These portions 40 extend away from the tightening mechanism 32, beyond the points at which the straps 30 are tangent to the connecting flanges 38 to assure that an inward force is applied to the ends of the portions 40 nearest the point of tangency. The constricting straps 30 extend around the conduits 26 on top of the interconnecting flanges 38 and also extend above the elongate U-shaped portions 40 where they terminate in common tabs 42 (see FIG. 4) which are narrower than the space between the straps 30 so that they can be doubled back on the elongate U-shaped portions 40, being suitably affixed thereto by welds or the like. With this construction both of the straps 30 and the tabs 42 can be made from a single sheet of metal. Loops 44 are formed on top of the elongate, U-shaped portions 40, which loops 44 hold trunnion members 46 and 48 constituting part of the tightening mechanism 32. A bolt 50 extends through suitable passages in the trunnion members 46 and 48 which are drawn together when a nut 52 is turned onto the bolt 50. It is to be understood that the tightening mechanism 32 can be of any suitable type and that the specific form shown does not constitute part of the invention.

When the trunnion members 46 and 48 are drawn together, they reduce the effective diameter of the constricting straps 30 which exert direct, radially inward forces on the interconnecting flanges 38 and draw the U-shaped segments 36 downwardly on the sealing flanges 34, without placing any direct force on the segments 36. This produces a camming or wedging action on the outer, sloping surfaces of the sealing flanges 34, thereby forcing them into sealing engagement, as shown in FIG. 2. Because of the fact that the inward force is applied by the constricting straps 30 to the interconnecting flanges 38, rather than to the top of the U-shaped segments 36, as is conventional in the art, the segments 36 have a greatly reduced tendency to spread than heretofore. Also, by employing the separate connecting flanges 38 and strap 30, the strap can slide or move when being tightened to assure uniformity of force on the channel 28. The arrangement of the tabs 42 and the constricting elements 30 also enable the radially inward force to be distributed along the elongate portions 40 to avoid a concentration of force under the trunnion members, thus providing a substantially uniform radial force over the entire circumferential length of the clamping channel 28. In conduit couplings now known in the art, the inward force exerted by the tightening mechanism on the sealing components immediately thereunder is greater than that exerted at other portions of the clamp. The interconnecting flanges 38 have ears 54 integral therewith which extend partially around the constricting straps 30 to hold them in spaced relationship and to prevent them from sliding off the interconnecting flanges 38.

Referring more particularly to FIG. 5, a modified clamp 56 includes a clamping channel 58, constricting straps or elements 60, and a tightening mechanism 62. In this embodiment, the clamping channel 58 includes a plurality of U-shaped or channel-shaped segments 64 similar to the segments 36 of the clamping channel 28, but each having outwardly extending portions 66 which are welded or otherwise suitably attached to interconnecting flanges 68 so as to be structurally integral therewith. The flanges 68 are integral with the constricting straps or elements 60 which extend beyond the ends of the flanges 68 and are doubled back and welded together to form loops 70 which circumvent trunnion members 72 and 74. The members 72 and 74 are supported above the segments 64 by the loops 70 and by supporting strips 76 which are bent into generally rectangular shapes and are welded to the constricting elements 60.

With the clamp 56, when the trunnion members 72 and 74 are drawn toward one another by a bolt 78, inward force is applied directly through the constricting straps 60 and the flanges 68 rather than directly through the segments 64, in the same manner as is done in the case of the clamp 22 shown in FIGS. 1–4. Further, the supporting strips 76 enable the tightening mechanism 62 to apply radially inward force through the end portions of the flanges 68 as effectively as through the other portions. Further, the supporting strips 76 apply radially inward force on the flanges of the end segment 64 rather than on top of it as is the case with the channel portions 40 of FIG. 1, to minimize spreading thereof. By making the connecting flanges 68 integral with the straps 60, the long channel portions 40 can be eliminated, although they spread the radially inward force under the tightening mechanism 32 more effectively than do the end segments 64.

Referring to FIG. 6, a modified clamp 80 includes a clamping channel 82, constrictor straps or elements 84, and a tightening mechanism 86. The clamping channel 82 includes a plurality of U-shaped or channel-shaped segments 88 which are integral with connecting flanges 90, the segments 88 and the connecting flanges 90 being all one unit. Supporting strips 92 of triangular shape are located between the connecting flanges 90 and end portions of the constricting straps 84 which form end loops 94 by being doubled back and welded together. The tightening mechanism 86 includes trunnion members 96 and 98 held in the loops 94 and a bolt 100 extending through both, which bolt is tightened by a nut 102.

When the tightening mechanism 86 draws the trunnion members 96 and 98 toward one another, the constricting straps 84 apply direct inward force to the connecting flanges 90 and draw the segments 88 radially inwardly in the same manner as is true of the previous embodiments. The triangular-shaped supporting strips 92 also spread the radially inward force under the tightening mechanism 86 as well as apply the force to the flanges 90, as in the previous embodiment. The straps 84 can again slide on the flanges 90 to apply inward force more uniformly.

Referring to FIGS. 7 and 8, a clamp 104 includes a clamping channel 106, constricting straps or elements 108 and a tightening mechanism 110. The clamping channel 106 includes a plurality of U-shaped or channel-shaped segments 112 integral with connecting flanges 114 and the constricting straps 108 extend from the flanges 114 and are doubled back on themselves to form loops 116. The loops 116 enclose triangular shaped metal inserts or supports 118 which are welded to the straps 108 and have recesses 120 to receive trunnion members 122 and 124. A bent bolt 126 extends through these trunnion members and tightening is effected by a nut 128 threaded thereon.

When the nut 128 is tightened and the trunnion members 122 and 124 are drawn together, inward forces are exerted again on the connecting flanges 114 of the U-shaped segments 112, rather than on the tops of the segments 112. The triangular metal supports 118 distribute the inward force over the end portions of the clamping channel 106 and applies the force to the flanges 114 rather than on top of the segments 112. The straps 108 cannot slide on the flanges 114, being integral therewith. However, the integral combination of the constrictor straps 108, the flanges 114, and the segments 112 still further reduces cost of manufacture and the weight of the channel 106.

Referring to FIG. 9, a modified clamp 130 includes a clamping channel 132, constricting straps or elements 134, and tightening mechanism 136, the clamping channel 132 being similar to the clamping channel 106, including U-shaped or channel-shaped segments 138 integral with connecting flanges 140. The constricting straps 134 extend beyond ends of the channel 132 and are doubled back to form loops 142. In this instance, an elongate, arcuate, U-shaped segment 144 is employed between the ends of the channel 132 with trunnion members 146 and 148 of the tightening mechanism 136 supported thereon. The segment 144 enables the tightening mechanism 136 to distribute a radially inward force on portions of the sealing components located therebelow when a nut 150 is tightened on a bolt 152. The force is applied on top of the segment 144, tending to spread it; however, the segment 144 is stronger than a number of the individual segments 138 because of its integral construction.

Figure 10:
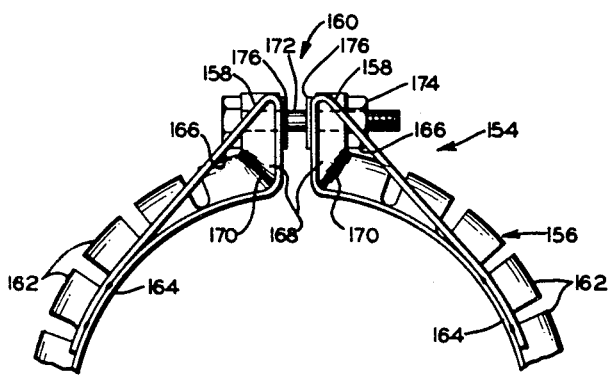
FIG. 10 is a fragmentary, side view of yet another modified clamp embodying the principles of the invention.
Figure 11:
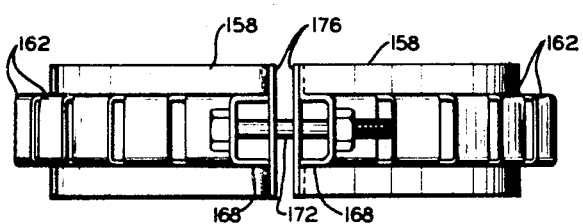
FIG. 11 is a top view of the clamp shown in FIG. 10.

Referring to FIGS. 10 and 11, a clamp 154 includes a clamping channel 156, and tightening means 160. The clamping channel 156 includes segments 162 connected by connecting flanges 164 which are integral therewith and from which the constricting straps 158 extend. The constricting straps 158 are doubled back and welded to themselves to form triangular loops 166. Within these loops are end segments 168 of the clamping channel 156 which are cut back slightly and welded at 170 to the adjacent segments 162 to provide a support for a bolt 172 and a nut 174 of the tightening means 160. Rather than being welded to the adjacent segments 162, the end segments 168 can be integral therewith. In addition, opposed plates 176 are welded to the portions of the connecting flanges 164 adjacent the end segments 168 to provide additional strength for the radially extended portions of the end segments. Thus, it will be readily seen that the clamping channel 156 also serves the additional functions of providing support for the tightening means 160 and of eliminating the need for trunnions or the like.

The constricting straps 158 exert radially inward force on the connecting flanges 164 of the segments 162 and the end supporting segments 168 provide radially inward force on the portions of the sealing components located below the tightening means 160 although they do not distribute this force as effectively as most of the previous embodiments.

Referring to FIGS. 12–14, another modified clamp 178 includes a clamping channel 180, constricting straps or elements 182, and tightening means 184. The channel 180 includes a plurality of U-shaped or channel-shaped segments 186 having outwardly extending portions 188 which are attached to a connecting flange 190. In this instance, the outwardly extending portions 188 of the end segments 186 have ears 192 bent upwardly around the segments 186, as best shown in FIG. 14, to provide supports for end loops 194 and for trunnion members 196 and 198 of the tightening means 184. The straps 182 are held in spaced relationship by an integral cross strip 200 (FIG. 13) and by a T-shaped cross strip 202 near the loops 194. The strip 202 has a shank 204 extending under the trunnion members 196 and 198, a bolt 206 and a nut 208. The shank 204 terminates in a tang 210 which catches on the cross strip 200 if the nut 208 is removed from the bolt 206, thus preventing the clamping band 180 from being separated accidentally from conduits with which it is associated.

The constricting straps 182 apply inward force on the connecting flanges 190 when the nut 208 is tightened. The supporting ears 192 also enable inward force to be applied to the portions 188 as well as to the top of the segments 186, although the inward force is not distributed to any extent by the ears 192.

Referring to FIGS. 15–17, an additional modified clamp 212 includes a clamping channel 214, constricting straps or elements 216, and a tightening mechanism 218. The clamping channel 214 includes a plurality of segments 220, outwardly extending portions 222, and connecting flanges 224 extending around, and attached to, the portions 222. The constricting elements 216 are doubled back to form loops 226 which hold trunnion members 228 and 230 of the tightening mechanism 218, the trunnion members 228 and 230 receiving a bolt 232 having a nut 234.

The constricting elements 216 are provided with L-shaped supporting ears 236 (FIG. 17) which rest on the portions 222 of the clamping channel 214 to provide a downward force on those portions of the sealing components below the tightening mechanism 218, although the distribution of this force is quite limited.

The constricting elements 216 and the connecting flanges 224 are held in spaced relationship by U-shaped spacers 238 affixed thereto and extending laterally around the U-shaped segments 220 of the clamping channel 214. A peripheral element 239 extends around the tops or webs of the U-shaped segments 220 and includes offset portions 240 at intermediate parts of the segments 220 which hold the U-shaped spacers 238 yet enable them to slide along the segments 220. The element 239 also includes spaced tangs 242 at one end which coact with a T-shaped connection 244 at the other end to prevent accidental separation of the clamp 272 from the conduits with which it is associated, if the nut 234 should be removed from the bolt 232.

Various modifications of the above described embodiments of the invention will be apparent to those skilled in the art and it is to be understood that such modifications can be employed without departing from the scope of the invention, if within the spirit and tenor of the accompanying claims.

I claim:

1. A clamp for joining sealing components at adjacent ends of two generally longitudinally-aligned conduits, said clamp comprising a plurality of generally channel-shaped segments, each having a web and side walls; a flange extending laterally from the free edge of each side wall of said segments and structurally integral with each; flange connecting means for interconnecting and supporting said flanges in longitudinally-spaced, aligned relationship, said segments adapted, when extending around a substantial portion of the peripheries of the conduits, to engage portions of the sealing components and, when moved radially inwardly, to move the sealing components into sealing relationship; constricting strap means extending around said flanges and flange connecting means; and tightening means effective, when said flanges, segments and constricting strap means extend around the peripheries of the conduits, to draw said segments radially inwardly by reducing the effective diameter of said constricting strap means.

2. Apparatus according to claim 1 wherein said flanges and means for interconnecting and supporting said flanges comprise a single integral structure.

3. Apparatus according to claim 1 wherein said means for interconnecting and supporting said flanges comprise a pair of straps to which said flanges are welded on both sides of said channel-shaped segments.

4. Apparatus according to claim 1 and means associated with said constricting strap means and said flange connecting means for preventing lateral movements of said straps with respect to said flanges and flange connecting means while still allowing circumferential movement therebetween.

5. A clamp for joining sealing components at adjacent ends of two generally longitudinally-aligned conduits, said clamp comprising a plurality of generally channel-shaped segments, each having a web and side walls; a flange extending laterally from the free edge of each side wall of said segments and structurally integral with each; flange connecting means for interconnecting and supporting said flanges in longitudinally-spaced, aligned relationship, said segments adapted, when extending around a substantial portion of the peripheries of the conduits, to engage portions of the sealing components and, when moved radially inwardly, to move the sealing components into sealing relationship; double-ended constricting strap means extending around said flanges and flange connecting means with each of the ends of the constricting strap means terminating in a loop portion; and tightening mechanism components carried by said loop portions to draw said loop portions into proximity and effective, when said flanges, segments and constricting strap means extend around the peripheries of the conduits, to draw said segments radially inwardly by reducing the effective diameter of said constricting strap means.

References Cited in the file of this patent

UNITED STATES PATENTS

| | | |
|---|---|---|
| 2,403,449 | Meyers et al. | July 9, 1946 |
| 2,548,216 | Houghton et al. | Apr. 10, 1951 |
| 2,548,249 | Woolsey | Apr. 10, 1951 |
| 2,842,385 | Webster et al. | July 8, 1958 |
| 2,893,097 | Hill et al. | July 7, 1959 |
| 3,029,095 | King et al. | Apr. 10, 1962 |

FOREIGN PATENTS

| | | |
|---|---|---|
| 547,975 | Canada | Oct. 29, 1957 |
| 1,155,824 | France | Dec. 2, 1957 |
| 1,249,718 | France | Nov. 21, 1960 |
| 439,140 | Great Britain | Nov. 29, 1935 |
| 798,288 | Great Britain | July 16, 1958 |